United States Patent
Wu et al.

(10) Patent No.: US 9,377,630 B2
(45) Date of Patent: Jun. 28, 2016

(54) 3D DISPLAY DEVICE AND MANUFACTURING METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Yanbing Wu, Beijing (CN); Jinye Zhu, Beijing (CN); Xiaohu Guo, Beijing (CN); Weitao Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 13/703,738

(22) PCT Filed: Nov. 9, 2012

(86) PCT No.: PCT/CN2012/084411
§ 371 (c)(1),
(2) Date: Dec. 12, 2012

(87) PCT Pub. No.: WO2013/071843
PCT Pub. Date: May 23, 2013

(65) Prior Publication Data
US 2014/0176833 A1    Jun. 26, 2014

(51) Int. Cl.
*G02B 27/26* (2006.01)
*G02B 27/22* (2006.01)
*H04N 13/04* (2006.01)

(52) U.S. Cl.
CPC ............ *G02B 27/2214* (2013.01); *G02B 27/26* (2013.01); *H04N 13/0404* (2013.01); *H04N 2213/001* (2013.01)

(58) Field of Classification Search
CPC combination set(s) only.
See application file for complete search history.

(56) References Cited

U.S. PATENT DOCUMENTS 5,161,039 A * 11/1992 Schellenberg ........... G02B 1/04
                                                              252/585
5,648,870 A *  7/1997 Mistutake ................ 359/487.05
(Continued)

FOREIGN PATENT DOCUMENTS

CN           1890988 A         1/2007
CN         101169519 A         4/2008
(Continued)

OTHER PUBLICATIONS

Chinese Rejection Decision dated Aug. 5, 2014; Appln: No. 201110359374.9.
(Continued)

*Primary Examiner* — Edward Glick
*Assistant Examiner* — Anthony G Quash
(74) *Attorney, Agent, or Firm* — Ladas & Parry LLP

(57) ABSTRACT

An embodiment of the invention provides a 3D display device and a manufacturing method thereof. The 3D display device includes a display unit; and a birefringent grating stacked at a light emitting side of the display unit, wherein the birefringent grating including a concave lens film, and liquid crystal polymer covering the concave lens film, a long or short axis of the liquid crystal polymer being parallel to a ridge direction of the concave lens film, and a polarization direction of emitting light of the display unit is parallel to the ridge direction of the concave lens film of the birefringent grating.

8 Claims, 4 Drawing Sheets

(56) References Cited

U.S. PATENT DOCUMENTS

| | | |
|---|---|---|
| 2003/0161040 A1 | 8/2003 | Ishii et al. |
| 2006/0280100 A1* | 12/2006 | Ooi et al. ............... 369/112.02 |
| 2007/0008619 A1* | 1/2007 | Cha et al. ................. 359/462 |
| 2007/0121210 A1* | 5/2007 | Sato .......................... 359/569 |
| 2009/0033812 A1* | 2/2009 | Ijzerman et al. ............ 349/15 |
| 2010/0007806 A1 | 1/2010 | Woodgate et al. |
| 2011/0102690 A1 | 5/2011 | Kikuchi et al. |
| 2011/0299000 A1* | 12/2011 | Woodgate et al. ........... 349/15 |
| 2012/0003380 A1 | 1/2012 | Yu |
| 2012/0008203 A1 | 1/2012 | Ijzerman et al. |
| 2014/0009704 A1* | 1/2014 | Pijlman et al. .............. 349/15 |
| 2014/0022619 A1* | 1/2014 | Woodgate et al. .......... 359/240 |

FOREIGN PATENT DOCUMENTS

| | | | |
|---|---|---|---|
| CN | 101287144 | * 10/2008 | ............ G02B 27/22 |
| CN | 101287144 A | 10/2008 | |
| CN | 101512391 A | 8/2009 | |
| CN | 101881848 A | 11/2010 | |
| CN | 101907778 A | 12/2010 | |
| CN | 101968595 A | 2/2011 | |
| CN | 102067020 A | 5/2011 | |
| CN | 102087415 A | 6/2011 | |
| CN | 201966999 U | 9/2011 | |
| CN | 102654654 A | 9/2012 | |
| JP | 2009-157301 A | 7/2009 | |
| JP | 2010160385 A | * 7/2010 | ............ G02F 1/13 |
| WO | 2011/125986 A1 | 10/2011 | |

OTHER PUBLICATIONS

International Search Report dated Feb. 28, 2013; PCT/CN2012/084411.

First Chinese Office Action dated Jul. 18, 2013; Appln. No. 201110359374.9.

Second Chinese Office Action dated Mar. 5, 2014; Appln. No. 201110359374.9.

International Preliminary Report on Patentability dated May 20, 2014; PCT/CN2012/084411.

Chinese Notice of Reexamination Appln. No. 201110359374.9; Dated Apr. 2, 2015.

* cited by examiner orientation direction of
liquid crystal molecules

3D DISPLAY DEVICE AND MANUFACTURING METHOD THEREOF

FIELD OF THE INVENTION

Embodiments of the disclosed technology relate to a 3D display device and a manufacturing method thereof.

BACKGROUND 3D display has become a major trend in the display field. The basic principle of the stereoscopic display is to produce a stereoscopy by utilizing a parallax, i.e., to make a viewer's left eye see a left-eye image and right eye see a right-eye image, where the left-eye image and the right-eye image here are a pair of stereoscopic images with parallax. A so-called 3D display device makes the left and right eyes receive two 2D (2-dimension) images having the parallax, respectively, so that a 3D image can be perceived after the brain acquires different 2D images.

In prior art, there are two ways to manufacture a birefringent grating for the 3D display device. The first way is in that: coating an alignment layer on a glass substrate followed by rubbing; next, preparing a concave lens film on another glass substrate; then, performing a rubbing treatment on the concave lens film (as an alternative, an alignment layer may be coated, however, the currently available material for the alignment layer may dissolve the material of the concave lens film, and thus, the rubbing treatment is performed directly on the concave lens film in practice); next, assembling the two substrates and injecting liquid crystals into a space therebetween; and orienting and curing the liquid crystals. The second way is in that: preparing a layer of transparent electrode on a glass substrate; forming an alignment layer on the layer of transparent electrode and then performing a rubbing treatment; forming a layer of transparent electrode on another glass substrate followed by forming a concave lens film; then performing a rubbing treatment (as an alternative, an alignment layer may be coated, however, the currently available material for the alignment layer may dissolve the material of the concave lens film, and thus, the rubbing treatment may be performed directly on the concave lens film in practice); next, assembling the two substrates and injecting liquid crystals into a space therebetween, wherein the deflection of the liquid crystals is controlled by applying a voltage to the transparent electrodes of the two substrates so as to achieve 3D display.

In a manufacturing process for a conventional birefringent grating of the 3D display device, the rubbing and orienting of a concave lens film are factors affecting the 3D display quality. For a general TN (twisted nematic) type LCD, an angle between a polarization direction of emitting light of a polarizer and a horizontal plane is 45 degrees. And for an IPS (in-plane switching) type LCD, an angle between a polarization direction of emitting light of a polarizer and a horizontal plane is 90 degrees or zero degree. An angle between a ridge direction of the concave lens film of the birefringent grating and the horizontal plane is θ, which is generally different from the angle between the polarization direction of emitting light of the polarizer and the horizontal plane, however, in the birefringent grating of such a 3D display device, it is required that the orientation of the liquid crystal molecules is parallel to the polarization direction of emitting light of the polarizer, which means that a rubbing direction forms a certain angle with the ridge direction of the concave lens film, as shown in FIG. 1. Thus, a part of rubbing furs may rub peak positions of the concave lens film, and some of the rubbing furs may rub valley positions of the concave lens film. Generally, a width of the concave lens film is very narrow, and the valley is deep. In this case, the liquid crystal molecules at the valleys can not be well oriented and thereby the 3D display effect is substantially degraded.

SUMMARY

An embodiment of the invention provides a 3D display device and a manufacturing method thereof. The 3D display device has better liquid crystal orientation effect and is capable of achieving better 3D display.

The 3D display device of an embodiment of the invention comprises a display unit; and a birefringent grating stacked at a light emitting side of the display unit, wherein the birefringent grating comprising a concave lens film, and liquid crystal polymer covering the concave lens film, a long or short axis of the liquid crystal polymer being parallel to a ridge direction of the concave lens film, and a polarization direction of emitting light of the display unit is parallel to the ridge direction of the concave lens film of the birefringent grating.

Alternatively, the display unit comprises a display and a half-wave plate disposed between the display and the birefringent grating, and the half-wave plate is used to adjust a polarization direction of emitting light of the display to be parallel to the ridge direction of the concave lens film of the birefringent grating. An angle between the ridge direction of the concave lens film and a horizontal plane is θ, and an angle between the polarization direction of the emitting light of the display and the horizontal plane is α, and an angle between an optical axis direction of the half-wave plate and the horizontal plane is $(\alpha+\theta)/2$.

Alternatively, the angle between the polarization direction of the emitting light of the display and the horizontal plane is 0°, 45° or 90°.

As an example, the half-wave plate comprises two substrates each having a transparent electrode and an alignment layer, and liquid crystal polymer interposed between the two substrates, and the optical axis direction of the half-wave plate is adjusted to have an angle of $(\alpha+\theta)/2$ with respect to the horizontal plane by controlling deflection of liquid crystal molecules in the liquid crystal polymer.

Alternatively, the half-wave plate comprises upper and lower substrates and alignment layers formed on the surfaces thereof, and liquid crystal polymer interposed between the upper and lower substrates, and a rubbing direction on a surface adjacent to the display unit thereof has an angle of a with respect to the horizontal plane, and a rubbing direction on another surface thereof has an angle of θ with respect to the horizontal plane.

As an example, the liquid crystal polymer is a polymerizable material having a birefringent property.

As an example, the display unit is a LCD, a PDP or an EL.

An embodiment of the invention further provides a method for manufacturing a above 3D display device, comprising steps of:

A1, preparing the display unit, the polarization direction of the emitting light of the display unit being adjusted to be parallel to the ridge direction of the concave lens film of the birefringent grating to be formed later;

B1, forming the concave lens film on a light emitting side surface of the display unit;

C1, rubbing the concave lens film along the ridge direction of the concave lens film;

D1, forming liquid crystal polymer on a light emitting side surface of the concave lens film;

E1, forming an alignment layer on another transparent substrate followed by orienting through rubbing, after which the another substrate formed with the alignment layer is assembled together with the concave lens film to form the birefringent grating, with liquid crystal polymer interposed therebetween; and F1, orienting and curing the liquid crystal polymer in the birefringent grating.

Alternatively, the method comprises coating an alignment layer on the concave lens film after step A1 and before step B1.

Alternatively, the step A1 may further comprise disposing a half-wave plate at a light emitting side of a display of the display unit, the half-wave plate positioned between the display and the birefringent grating, for adjusting a polarization direction of emitting light of the display to be parallel to the ridge direction of the concave lens film of the birefringent grating.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A First Embodiment

Figure 1:
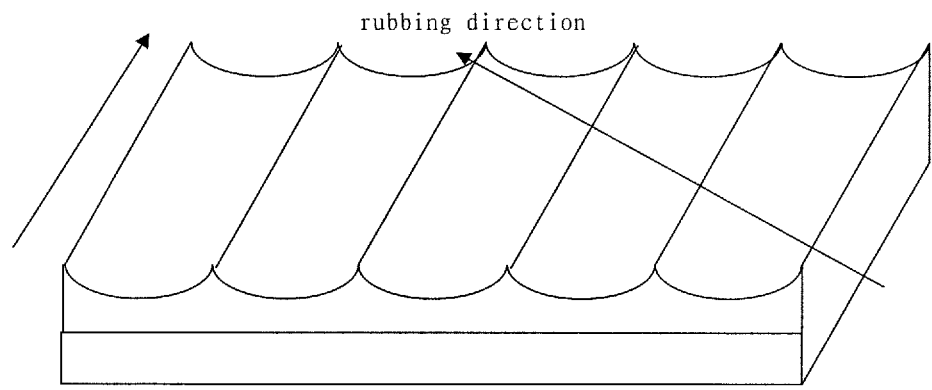
FIG. 1 is a schematic diagram of rubbing a concave lens film of a birefringent grating in a 3D display device in prior art.
Figure 2:
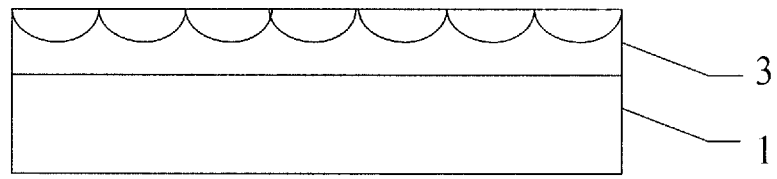
FIG. 2 is a structural schematic view of a 3D display device according to an embodiment of the invention.

As shown in FIG. 2, a 3D display device according to the first embodiment of the invention comprises a display unit 1 and a birefringent grating 3 stacked at a light emitting side of the display unit 1.

Generally, a thin film is formed (e.g., by deposition) on a light emitting side surface of the display unit 1 and then is processed to form the birefringent grating 3.

Alternatively, a transparent substrate may be disposed on the light emitting side surface of the display unit 1, and then on the transparent substrate, the birefringent grating 3 is formed.

Figure 3:
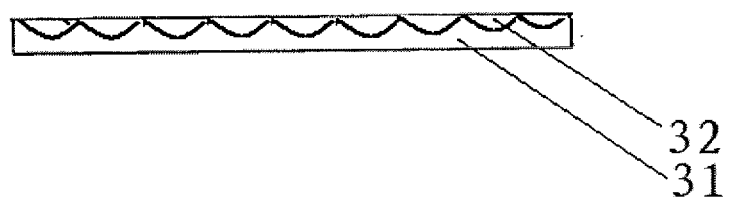
FIG. 3 is a structural schematic view of a birefringent grating in a 3D display device according to an embodiment of the invention.

As shown in FIGS. 2 and 3, the birefringent grating 3 comprises a concave lens film 31 and liquid crystal polymer 32 on the concave lens film 31. A long axis or short axis of the liquid crystal polymer 32 is parallel to a ridge direction of the concave lens film, which depends on whether a refractive index of the concave lens film 31 matches the long axis the liquid crystal polymer 32 or the refractive index of the concave lens film 31 matches the short axis of the liquid crystal polymer 32. As used herein, the term "match" means that a refractive index of the liquid crystal polymer 32 in the long or short axis direction equals or approaches the refractive index of the concave lens film. For example, liquid crystal molecules 321 in the liquid crystal polymer 32 may be orientated in parallel along the ridge direction of the concave lens film (this case is a short axis matching). The liquid crystal polymer may be a polymerizable material having a birefringent property.

Figure 7:
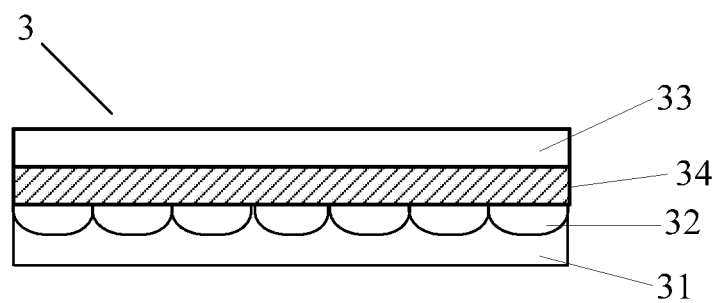
FIG. 7 is a cross-sectional structural view of an exemplary birefringent grating according to an embodiment of the invention.

Alternatively, the birefringent grating 3 may further comprise an alignment layer 34 disposed at a light emitting side of the liquid crystal polymer 32, as shown in FIG. 7. The alignment layer 34 is formed on another transparent substrate 33, for example, a glass substrate.

One example of the display unit 1 is a LCD (liquid crystal display). As an example, the display unit 1 may also include a PDP (plasma display panel) display or an EL (electroluminescent) display having a polarizer disposed at a light emitting side thereof. Here, a polarization direction of emitting light of the display unit 1 is parallel to the ridge direction of the concave lens film of the birefringent grating 3.

Figure 8:
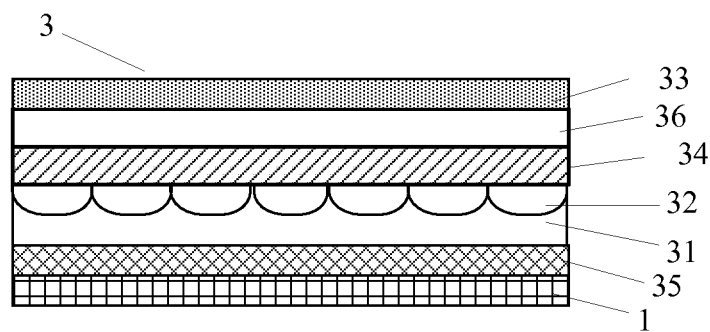
FIG. 8 is a cross-sectional structural view of an exemplary birefringent grating according to an embodiment of the invention.

As an alternative embodiment, the birefringent grating 3 may sequentially comprises a transparent electrode 35, a concave lens film 31, liquid crystal polymer 32 covering the concave lens film, an alignment layer 34, a transparent electrode 36 and a transparent substrate 33, as shown in FIG. 8.

In the above mentioned 3D display device, the polarization direction of the emitting light of the display unit 1, which enters into the birefringent grating 3, is parallel to the ridge direction of the concave lens film of the birefringent grating 3. Thus, when the concave lens film is rubbed, a rubbing direction can be parallel to the ridge direction of the concave lens film, guaranteeing a better rubbing effect, improving the liquid crystal orientation, and thus promoting a 3D display quality.

A Second Embodiment

Figure 4:
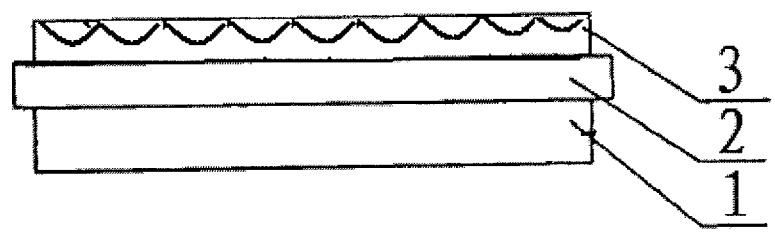
FIG. 4 is a structural schematic view of a 3D display device according to another embodiment of the invention.
Figure 5:
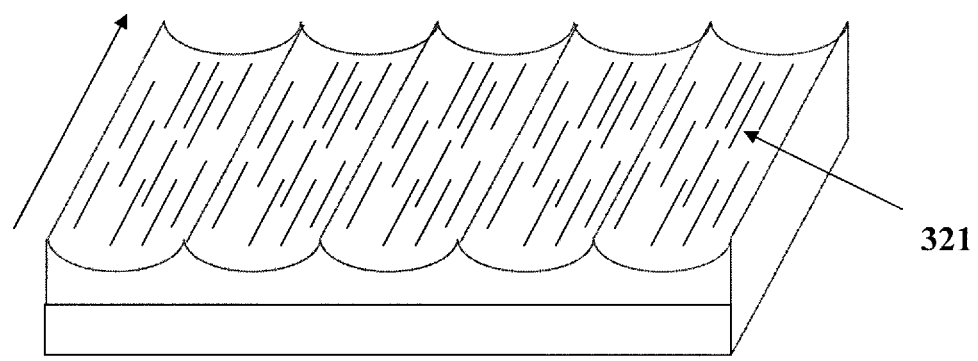
FIG. 5 is a working principle diagram of a birefringent grating in a 3D display device according to an embodiment of the invention.

As shown in FIG. 4, a 3D display device according to the second embodiment of the invention comprises a display unit 1, and a half-wave plate 2 and a birefringent grating 3 sequentially disposed on the display unit 1.

Generally, a thin film is deposited on a surface of the display unit 1, and then is processed to form the half-wave plate and the birefringent grating 3.

As shown in FIGS. 3 and 4, the birefringent grating 3 comprises a concave lens film 31 and liquid crystal polymer 32 thereon. Long or short axis of the liquid crystal polymer 32 is parallel to a ridge direction of the concave lens film, which depends on whether a refractive index of the concave lens film 31 matches the long axis the liquid crystal polymer 32 or the refractive index of the concave lens film 31 matches the short axis of the liquid crystal polymer 32. For example, liquid crystal molecules 321 in the liquid crystal polymer 32 may be orientated in parallel along the ridge direction of the concave lens film. The liquid crystal polymer may be a polymerizable material having a birefringent property. An angle between the ridge direction of the concave lens film and a horizontal plane is θ.

As an alternative embodiment, the birefringent grating 3 may sequentially comprises a transparent electrode 35, a concave lens film 31, liquid crystal polymer 32 covering the concave lens film, an alignment layer 34, a transparent electrode 36 and a transparent substrate 33.

One example of the display unit 1 is a LCD (liquid crystal display). As an example, the display unit 1 may also include a display such as a PDP (plasma display panel) display or an EL (electroluminescent) display having a polarizer disposed at a light emitting side thereof. An angle between a polarization direction of emitting light of the display unit 1 and the horizontal plane is α, for example, 0°, 45° or 90°.

Alternatively, in the present embodiment, when the display unit 1 is a display such as a PDP (plasma display panel) display or an EL (electroluminescent) display, the polarizer may not be disposed at the light emitting side of the display.

The half-wave plate 2 disposed between the display unit 1 and the birefringent grating 3, is used to adjust the polarization direction of the emitting light of the display unit 1 to be parallel to the ridge direction of the concave lens film of the birefringent grating 3 and an angle between an optical axis direction of the half-wave plate 2 and the horizontal plane is $(\alpha+\theta)/2$.

Further, the half-wave plate 2 may be a polarizing plate, or a polarizing film deposited on the display unit 1.

Figure 6:
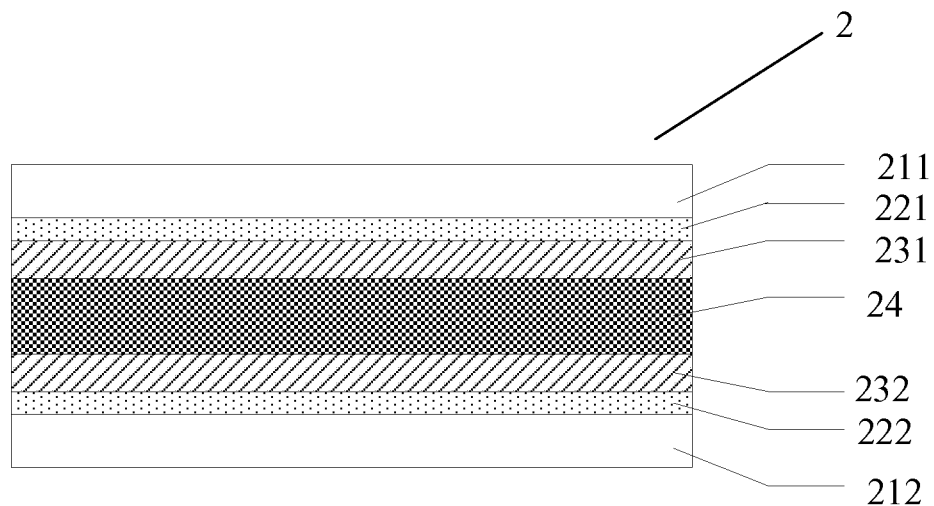
FIG. 6 is a cross-sectional structural view of an exemplary half-wave plate according to an embodiment of the invention.

Further, as shown in FIG. 6, the half-wave plate 2 may comprise two substrates 211 and 212, the substrate 211 having a transparent electrode 221 and an alignment layer 231 and the substrate 212 having a transparent electrode 222 and an alignment layer 232; and liquid crystal polymer 24, for example, a TN type liquid crystal, interposed between the two substrates 211 and 212. The optical axis direction of the half-wave plate 2 is adjusted to have an angle of $(\alpha+\theta)/2$ with respect to the horizontal plane by controlling deflection of the liquid crystal molecules in the liquid crystal polymer, that is, the polarization direction of the emitting light of the display unit 1 is adjusted to be parallel to the ridge direction of the concave lens film of the birefringent grating 3.

Figure 9:
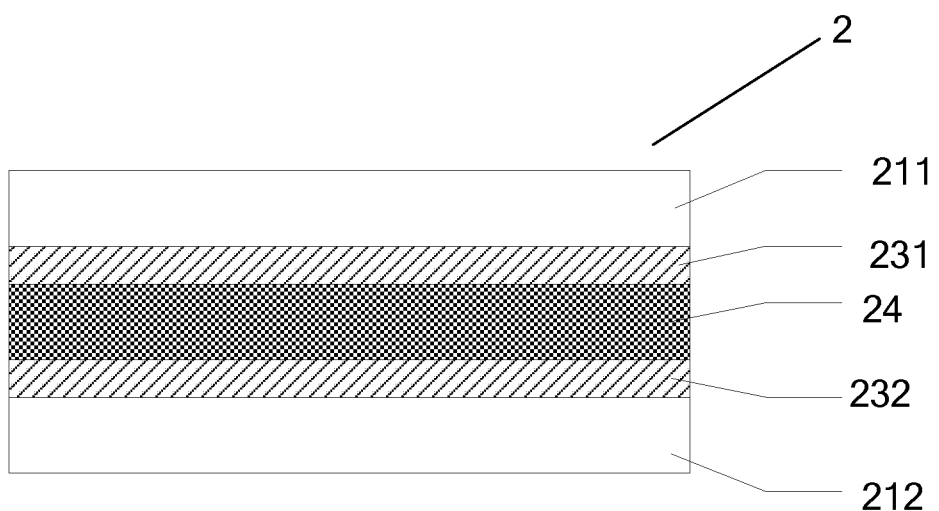
FIG. 9 is a cross-sectional structural view of an exemplary half-wave plate according to an embodiment of the invention.

Further, as shown in FIG. 9, the half-wave plate 2 may comprise upper and lower substrates 211 and 212 and alignment layers 231 and 232 formed on the surfaces thereof, and may further comprise liquid crystal polymer 24 interposed between the upper and lower substrates, for example, a TN type liquid crystal, wherein a rubbing direction on a surface adjacent to the display unit 1 thereof has an angle of α with respect to the horizontal plane and a rubbing direction on another surface thereof has an angle of θ with respect to the horizontal plane, and thus, the polarization direction of the emitting light of the display unit 1 is adjusted to be parallel to the ridge direction of the concave lens film of the birefringent grating 3.

In the above description, the half-wave plate 2 has been described to be independent of the display unit 1 for convenience of description. Alternatively, the half-wave plate 2 may be a part of the display unit 1, in which case the display unit 1 of the embodiment may comprise the half-wave plate 2.

In the above mentioned 3D display device, the polarization direction of the emitting light of the display unit 1, which enters into the birefringent grating 3, may be adjusted to be parallel to the ridge direction of the concave lens film of the birefringent grating 3. In this case, when the concave lens film is rubbed, a rubbing direction can be parallel to the ridge direction of the concave lens film, guaranteeing a better rubbing effect, improving the liquid crystal orientation, and thus promoting a 3D display quality.

A Third Embodiment

An embodiment of the invention further provides a manufacturing method for a 3D display device, which comprises the following steps.

Step A1, preparing a display unit, wherein a polarization direction of emitting light of the display unit is adjusted to be parallel to a ridge direction of a concave lens film of a birefringent grating to be formed later;

Step B1, forming the concave lens film, for example, by a deposition method, on a light emitting side surface of the display unit;

Step C1, rubbing the concave lens film along the ridge direction of the concave lens film;

Step D1, forming liquid crystal polymer on a light emitting side surface of the concave lens film;

Step E1, forming an alignment layer on another transparent substrate followed by a rubbing treatment, and then bonding the another substrate formed with the alignment layer with the concave lens film to form the birefringent grating with the liquid crystal polymer interposed therebetween; and Step F1, orienting and curing the liquid crystal polymer in the birefringent grating to complete the manufacturing for the 3D display device.

Alternatively, after the step A1 and before the step B1, the manufacturing method may further comprise disposing a transparent substrate on the light emitting side surface of the display unit, and the concave lens film formed in the step B1 will be directly formed on the transparent substrate.

Alternatively, after the step A1 and before the step B1, the manufacturing method may further comprise forming a transparent electrode on a transparent substrate disposed on the light emitting side surface of the display unit, and then, the concave lens film of the step B1 will be formed on the transparent electrode. Further, in the step E1, a transparent electrode is first formed on the another transparent substrate followed by forming an alignment layer on the transparent electrode and rubbing the alignment layer, after which the another substrate formed with the transparent electrode and the alignment layer is assembled together with the substrate having the concave lens film with liquid crystal polymer interposed therebetween.

As an example, the birefringent grating of the embodiment may be an assembled structure of the concave lens film and a sheet of glass having the alignment layer, with the liquid crystal polymer interposed therebetween.

As an example, the birefringent grating of the embodiment may also be an assembled structure of a transparent electrode and a concave lens film together with a sheet of glass having a transparent electrode and an alignment layer, with the liquid crystal polymer interposed therebetween.

In this manufacturing method, there is not change on the terminal difference in the rubbing treatment, resulting in a rubbing quality improvement and an excellent rubbing effect at a valley position.

Further, after the step A1 and before the step B1, the manufacturing method may further comprise a step of coating an alignment layer on the concave lens film for further enhancing an orientation effect.

It is to be noted that, after assembling the concave lens film and the another transparent substrate formed with an alignment layer together, the liquid crystal polymer has not been cured. When the liquid crystal polymer is heated, the liquid crystal molecules are oriented through rubbing on the upper and lower substrates. However, the liquid crystal molecules may be oriented without heating and heating may make the orienting quickly and better.

A Fourth Embodiment

An embodiment of the invention further provides a manufacturing method for a 3D display device, which comprises the following steps.

Step A2, preparing a display unit, wherein a polarization direction of emitting light of the display unit has an angle α, for example, 0°, 45° or 90°, with respect to the horizontal plane;

Step B2, adding a half-wave plate on a light emitting side surface of the display unit, so that the polarization direction of the emitting light of the display unit is adjusted to be parallel to a ridge direction of a concave lens film of a birefringent grating to be formed later, wherein an angle between an optical axis direction of the half-wave plate and the horizontal plane is $(\alpha+\theta)/2$, and $\theta$ is an angle formed between the ridge direction of the concave lens film and the horizontal plane;

Step C2, forming the concave lens film, for example, by a deposition method, on a light emitting side surface of the half-wave plate;

Step D2, rubbing the concave lens film along the ridge direction of the concave lens film, wherein an angle between the ridge direction of the concave lens film and the horizontal plane is $\theta$;

Step E2, forming liquid crystal polymer on a light emitting side surface of the concave lens film;

Step F2, forming an alignment layer on another transparent substrate followed by a rubbing treatment, after which the another substrate formed with the alignment layer is assembled together with the substrate having the concave lens film to form the birefringent grating, with the liquid crystal polymer interposed therebetween.

Step G2, orienting and curing the liquid crystal polymer in the birefringent grating to complete the manufacturing for the 3D display device.

Alternatively, after the step B2 and before the step C2, the manufacturing method may further comprise disposing a transparent substrate on the light emitting side surface of the half-wave plate, and the concave lens film formed in the step C2 will be directly formed on the transparent substrate.

Alternatively, after the step B2 and before the step C2, the manufacturing method may further comprise forming a transparent electrode on a transparent substrate disposed on the light emitting side surface of the half-wave plate, and then, the concave lens film of the step C2 will be formed on the transparent electrode. Further, in the step F2, a transparent electrode is first formed on the another transparent substrate followed by forming an alignment layer on the transparent electrode and rubbing the alignment layer, after which the another substrate formed with the transparent electrode and the alignment layer is assembled together with the substrate having the concave lens film, with liquid crystal polymer interposed therebetween.

In this manufacturing method, there is not change on the terminal difference in the rubbing treatment, resulting in a rubbing quality improvement and an excellent rubbing effect at a valley position.

Further, after the step B2 and before the step C2, the manufacturing method may further comprise a step of coating an alignment layer on the concave lens film for further enhancing the orientation effect.

As an example, the birefringent grating of the embodiment may be an assembled structure of the concave lens film and a sheet of glass having the alignment layer, with the liquid crystal polymer interposed therebetween.

As an example, the birefringent grating of the embodiment may also be an assembled structure of a transparent electrode and a concave lens film together with a sheet of glass having a transparent electrode and an alignment layer, with the liquid crystal polymer interposed therebetween.

In the embodiment, orientations of the liquid crystal molecules are changed and thus mismatch the polarization direction of the emitting light of the display unit. Therefore, it requires the half-wave plate to be disposed between the display unit and the birefringent grating for adjusting the polarization direction of the emitting light of the display unit to be parallel to the ridge direction of the concave lens film of the birefringent grating.

It is to be noted that, after assembling the concave lens film and the another transparent substrate formed with an alignment layer together, the liquid crystal polymer has not been cured. When the liquid crystal polymer is heated, the liquid crystal molecules are oriented through rubbing on the upper and lower substrates. However, the liquid crystal molecules may be oriented without heating and heating may make the orienting quickly and better.

As discussed above, embodiments of the invention disclose a 3D display device and a manufacturing method thereof. According to the embodiments of the invention, while manufacturing the 3D display device, the polarization direction of the emitting light of the display unit may be made parallel to the ridge direction of the concave lens film, or the half-wave plate may be added between the display unit and the birefringent grating to adjust the polarization direction of the emitting light of the display unit to be parallel to the ridge direction of the concave lens film of the birefringent grating, thereby a better rubbing effect is guaranteed, and the liquid crystal orientation is improved. Accordingly, the 3D display effect is promoted.

The descriptions made above are merely the specific embodiments of the present invention, but the protection scope of the present invention is not limited thereto. Modifications or replacements, which are easily conceived by those skilled in the art within the technical scope disclosed by the present invention, should be embraced within the protection scope of the present invention. Therefore, the protection scope of the present invention is defined by the protection scope of attached claims.

What is claimed is:

1. A method for manufacturing a 3D display device, comprising steps of:
   A1, preparing a display unit, a polarization direction of the emitting light of the display unit being adjusted to be parallel to a ridge direction of a concave lens film of a birefringent grating to be formed later;
   A2, disposing a transparent substrate on a light emitting side surface of the display unit;
   A3, forming a transparent electrode on the transparent substrate disposed on the light emitting side surface of the display unit;
   B1, forming the concave lens film on the transparent electrode;
   C1, rubbing the concave lens film along the ridge direction of the concave lens film;

D1, forming liquid crystal polymer on a light emitting side surface of the concave lens film to make the liquid crystal polymer being oriented by the concave lens film;

E1, forming an alignment layer on another transparent substrate followed by orienting through rubbing, after which the another substrate formed with the alignment layer is directly assembled together with the concave lens film to form the birefringent grating, with liquid crystal polymer interposed therebetween; and F1, orienting and curing the liquid crystal polymer in the birefringent grating.

2. The method according to claim 1, wherein the A1 further comprises disposing a half-wave plate at a light emitting side of a display of the display unit, the half-wave plate positioned between the display and the birefringent grating, for adjusting a polarization direction of emitting light of the display to be parallel to the ridge direction of the concave lens film of the birefringent grating.

3. The method according to claim 2, wherein the display is a liquid crystal display, a plasma display or an electroluminescent display.

4. The method according to claim 2, wherein an angle between the ridge direction of the concave lens film and a horizontal plane is $\theta$, and an angle between the polarization direction of the emitting light of the display and the horizontal plane is $\alpha$, and an angle between an optical axis direction of the half-wave plate and the horizontal plane is $(\alpha+\theta)/2$.

5. The method according to claim 4, wherein the half-wave plate comprises two substrates each having a transparent electrode and an alignment layer, and liquid crystal polymer interposed between the two substrates, and the optical axis direction of the half-wave plate is adjusted to have an angle of $(\alpha+\theta)/2$ with respect to the horizontal plane by controlling deflection of liquid crystal molecules in the liquid crystal polymer.

6. The method according to claim 4, wherein the half-wave plate comprises upper and lower substrates and alignment layers formed on the surfaces thereof, and liquid crystal polymer interposed between the upper and lower substrates, and wherein a rubbing direction on a surface adjacent to the display unit thereof has an angle of $\alpha$ with respect to the horizontal plane, and a rubbing direction on another surface thereof has an angle of $\theta$ with respect to the horizontal plane.

7. The method according to claim 1, after step A1 and before step B1, further comprises coating an alignment layer on the concave lens film.

8. The method according to claim 1, wherein the liquid crystal polymer is a polymerizable material having a birefringent property.

* * * * *